April 25, 1967 A. M. BARLOGA ETAL 3,316,082
OXYGEN STEELMAKING
Filed Dec. 8, 1964
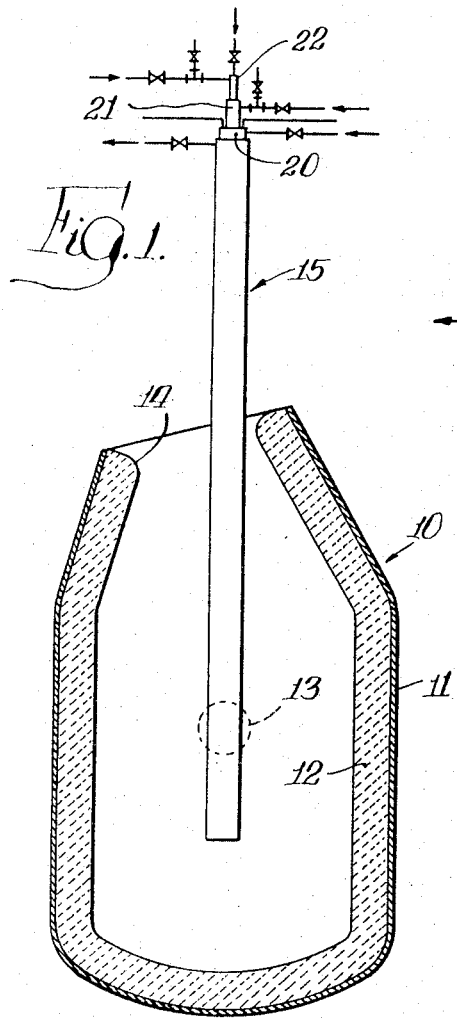
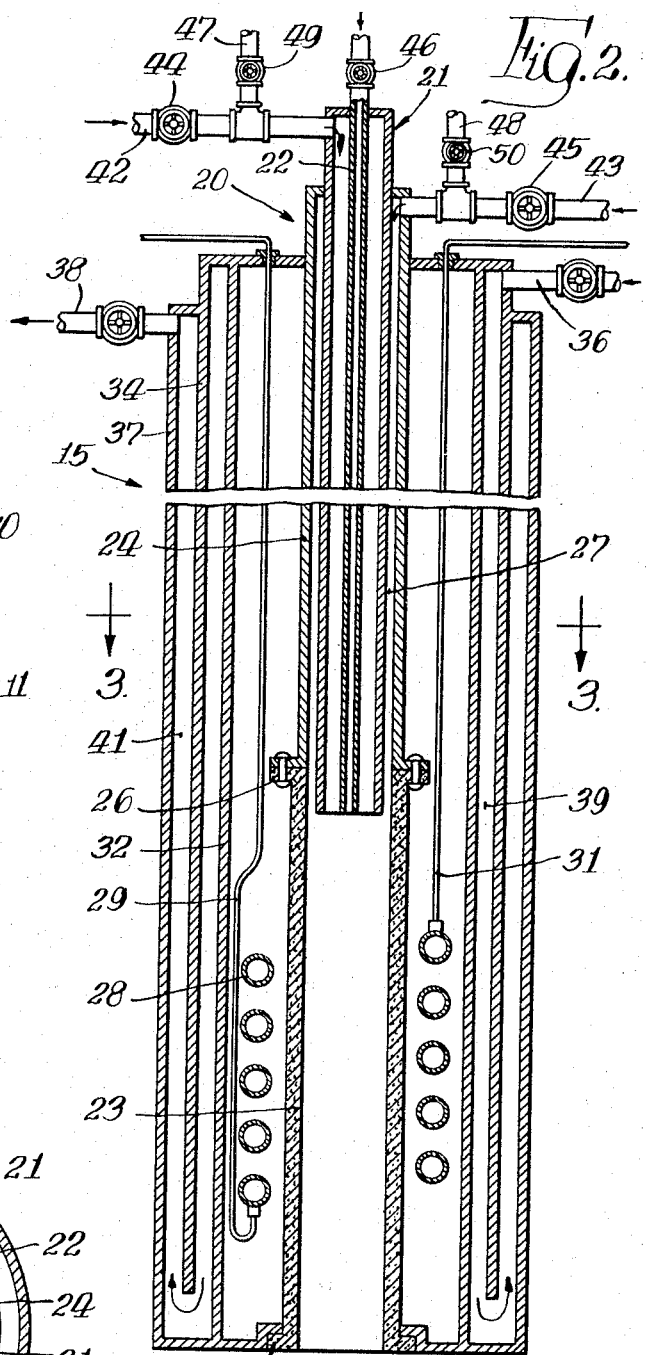
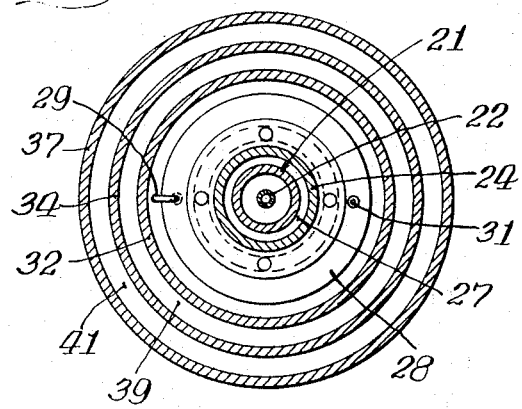
Inventors:-
Albert M. Barloga,
Arthur T. Morgan,
By Hibben, Noyes & Bicknell
Attys.

United States Patent Office 3,316,082
Patented Apr. 25, 1967

3,316,082
OXYGEN STEELMAKING
Albert M. Barloga, Calumet City, and Arthur T. Morgan, South Holland, Ill., assignors to Inland Steel Company, Chicago, Ill., a corporation of Delaware
Filed Dec. 8, 1964, Ser. No. 416,850
8 Claims. (Cl. 75—12)

This invention relates to improvements in the basic oxygen steelmaking process. More particularly, the invention pertains to a novel combined heating and refining nozzle and to the use of the same in a top blown basic oxygen converter.

In the basic oxygen steelmaking process, the charge consists predominantly of molten pig iron with predetermined amounts of added flux, iron ore, and scrap. The heat for the operation is generated entirely by the exothermic chemical reactions which occur when high purity oxygen is introduced and reacts with silicon, manganese, phosphorus, and carbon in the molten metal. Since the conventional process does not utilize a external heat source, the amount of solid scrap that can be charged is necessarily limited. Current commercial experience indicates that a maximum of about 30 wt. percent scrap can be utilized under the most favorable conditions, and in most instances the amount that can be used does not exceed about 25 wt. percent. This is in sharp contrast to the open hearth process which consumes an average of 50% scrap and in many cases as much as 100%.

There has long been a need to increase the amount of scrap (or other solids such as ore) that can be charged to a basic oxygen converter. Greater scrap utilization would diminish the dependence of the process on hot metal supply and would make it possible for the steel producer to take advantage of fluctuating scrap markets. Various expedients have been proposed, including preheating of the scrap or oxygen and the use of fuel inside the converter, to melt down a scrap charge prior to or during the conventional oxygen steelmaking sequence. However, such proposals introduce undesirable complications and in some cases result in undesirable lengthening of the process cycle.

Accordingly, a primary object of the present invention is to provide novel and improved means for increasing the scrap consumption in a basic oxygen steelmaking process.

A further object of the invention is to provide a novel apparatus for increasing the temperature of a gas supplied to a basic oxygen converter in order to permit increased scrap utilization.

Another obpect of the invention is to provide a novel and improved method for operating a basic oxygen converter in order to permit an increase in the amount of scrap that can be charged to the process.

An additional object of the invention is to provide novel means for supplying additional heat to a basic oxygen steelmaking process, without the use of external fuel, in order to permit an increase in the amount of scrap that can be utilized in the process.

Other objects and advantages of the invention will become evident from the subsequent detailed description in conjunction with the accompanying drawing, wherein:

FIG. 1 is a vertical sectional view of an oxygen converter and lance arrangement in accordance with the present invention;

FIG. 2 is an enlarged vertical sectional view of the lance shown in FIG. 1; and

FIG. 3 is a horizontal sectional view taken on the line 3—3 of FIG. 2.

Briefly described, the present invention comprises a novel combination of an oxygen lance and an induction plasma torch whereby the oxygen introduced to the reaction vessel can be preheated to any desired extent for rapidly melting the charged scrap at the beginning of the blowing cycle. Thereafter, the power for the plasma generator can be turned off and the oxygen blowing continued in the usual manner. If desired, a non-oxidizing gas, such as nitrogen or argon, can be used during the melt-down period to avoid excessive oxidation of the scrap.

FIG. 1 illustrates, in generally schematic fashion, a basic oxygen converter or reaction vessel 10 comprising an outer steel shell 11 and a basic inner refractory lining 12. The vessel is mounted for tilting by means of trunnions 13 which are reecived by suitable supports (not shown). The vessel has a somewhat restricted mouth 14 through which scrap, molten iron, and flux are charged in predetermined amounts. The vessel may be tilted to one side to facilitate charging, but thereafter the vessel is restored to upright position and a combined oxygen lance and plasma torch assembly 15 is inserted downwardly through the open mouth 14. Although not shown in the drawings, it will be understood that a suitable fume removal hood is also positioned over the mouth of the converter with the oxygen lance-plasma torch assembly 15 extending therethrough. High purity oxygen gas is blown onto the molten charge through the lance assembly 15 until the refining has been completed whereupon the lance assembly is withdrawn and the vessel is tilted to discharge the finished steel and slag.

FIGS. 2 and 3 illustrate in greater detail the combined oxygen lance-plasma torch assembly 15 which constitutes the main feature of the present invention.

A thermal plasma is a high temperature highly ionized gas which is many times hotter than a flame created by chemical combustion. The familiar electric arc generates a thermal plasma but is not a satisfactory method for practical utilization of the plasma. Another method of generating a thermal plasma is by means of the electrode-type plasma torch in which one electrode extends into another generally cup-shaped and apertured alectrode. The gas employed is passed through the arc between the electrodes and emerges as a thermal plasma from the aperture in the cup-shaped electrode. However, the electrode-coupled D.C. arc torch has several limitations due to the high temperature environment of the electrodes and the susceptibility of the electrodes to attack by certain gases.

For purposes of the present invention, the assembly 15 utilizes an induction plasma torch which has no permanent electrodes and depends upon high frequency induction heating to maintain and sustain a previously generated initial plasma. Thus, the assembly 15 has an outer tube 20, an intermediate tube 21, and a central inner tube 22, all arranged concentrically. The outer tube 20 has a lower plasma-containing section 23 formed from silica or other highly heat resistant material and an upper section 24 of steel or other suitable metal, the two sections being joined at 26. The intermediate tube 21 extends downwardly through the upper end of the tube section 24 in slightly spaced relation therefrom and terminates just below the joint 26 to provide an annular passage 27. The inner tube 22 is of relatively small diameter and extends downwardly through the upper end of the tube 21 along the axis thereof. A radio-frequency induction coil 28 of copper tubing or the like surrounds the tube section 23 and is connected to a suitable power source (not shown) by means of conductors 29 and 31.

The induction heat coil 28 is enclosed by a copper jacket 32 which is affixed at its upper end to the tube section 24 and has at its lower end a suitable joint 33 with the tube section 23. An inner tubular cooling jacket 34 surrounds the copper jacket 32 in concentric spaced relation therewith and is provided with a cooling water inlet 36. An outer cooling jacket 37 surrounds the jacket 34 in concentric spaced relation and has a cooling water outlet 38. The inner cooling jacket 34 terminates above the lower end of the outer jacket 37 so that the cooling water from the inlet 36 flows downwardly through an annular passage 39, beneath the lower end of the jacket 34, and thence upwardly through an annular passage 41 to the outlet 38.

The main oxygen supply to the combined oxygen lance-plasma torch assembly 15 is through an inlet 42 communicating with the upper end of the intermediate tube 21. Auxiliary oxygen, for the purpose described hereinafter, is supplied through an inlet 43 at the upper end of the tube section 24, which communicates with the annular passage 27, and also through the inner tube 22. Control valves 44, 45, and 46 are provided in the oxygen supply inlets 42 and 43 and in the tube 22, respectively, for independently regulating the flow rate and velocity of the oxygen streams.

A typical operation using the lance-torch assembly 15 is as follows.

After the vessel 10 has been charged with scrap, molten iron, and flux and has been restored to upright position, the assembly 15 is lowered through the vessel mouth 14 to a position preferably somewhat above the level of the bath. The induction plasma torch is started by initiating gas flow through the inlets 42 and 43, energizing the high frequency coil 28, and then coupling the coil to an elongated grounded electrode, such as a carbon, tungsten, or tantalum rod, which is inserted downwardly through the center tube 22. As the tip of the electrode heats up in the field of the coil 28, the surrounding gas is heated and eventually a small "pilot" thermal plasma is formed. Once the initial pilot plasma has formed, the coil 28 will couple to the plasma and the plasma is then enlarged and maintained by supplying adequate power to the coil 28. The starting electrode may then be withdrawn from the tube 22.

As is well known in plasma torch technology, the induction plasma torch is more easily started using a monatomic gas such as argon or helium, and after the torch has been started the gas supply can be switched to a diatomic gas such as oxygen. Accordingly, in the preferred operation, it will generally be desirable at the outset to supply argon to the tube 21 and the space 27 through separate branch inlets 47 and 48 having valves 49 and 50, and after the main plasma has been established and the starting electrode removed, the valves 49 and 50 can be closed gradually and the valves 44 and 45 opened gradually so as to maintain the plasma by oxygen supply. The power supplied to the coil 28 must be increased as the switch to oxygen takes place, and it will generally be desirable to provide cooling for the torch at higher power levels by a suitable flow of cooling water through the inlet 36, the passages 39 and 41, and the outlet 38.

The main supply of gas to maintain the plasma, both during starting and subsequently, is the relatively low velocity stream supplied through the tube 21 to the central region of the tube section 23 surrounded by the coil 28. The auxiliary gas stream from the inlet 43 flows downwardly through the restricted annular passage 27 at a relatively much higher velocity and serves as a protective film or sheath along the interior of the tube section 23 to provide additional cooling for the latter. As is also well known to those familiar with plasma torch operation, the plasma must be stabilized in some manner to prevent extinction or "blowing out." Various expedients may be utilized to obtain internal recirculation within the plasma region so as to avoid excessive cooling. In the illustrated embodiment of the invention, the desired recirculation and stabilization of the plasma are realized by injecting a relatively high velocity stream of oxygen through the center tube 22. The resultant aspiration effect, in combination with the high velocity gas stream from the annular passage 27, is effective to stabilize the plasma and to permit a flow rate of oxygen through the main supply tube 21 which is high enough to project the high temperature plasma appreciably beyond the lower end of the assembly 15.

The assembly 15 is operated as a plasma torch for a sufficient period of time to effect melting of the scrap charge. Inasmuch as the plasma temperature is very high, the desired melting of the solid scrap can be effected quite rapidly, usually a matter of a few minutes. Although plasma torch temperatures as high as 25,000° F. are easily obtainable, for practical purposes it is adequate to regulate the torch operation so as to obtain a temperature of from about 3000° F. to about 10,000° F. As soon as the scrap has been melted and the charge is completely molten, the power to the plasma torch is turned off so as to permit operation of the assembly 15 as a conventional oxygen lance. The auxiliary oxygen supply to the inlet 43 and the pipe 22 is no longer needed and may be turned off. In general, the desired oxygen velocity and flow rate is greater when the device is being operated as a lance than when it is being used as a plasma torch for scrap melting. Accordingly, the oxygen supply to the tube 21 is now increased by regulation of the valve 44, and the refining reactions are completed in the usual manner. Of course, water cooling of the lance is maintained as previously described.

Although, for ease of starting, the plasma torch is preferably started with a gas such as argon after which the gas flow is then switched to oxygen as described above, it is possible and within the scope of the invention to use oxygen gas throughout the entire period, including starting of the pilot plasma, by suitably increasing the power input to the coil 28. An alternative operation which may be advantageous in some cases is to start the torch using argon, nitrogen or other inert gas and to maintain the plasma with inert gas throughout the scrap melting period. In this way excessive oxidation of the scrap, which can occur with oxygen, is avoided. Thereafter, when operation of the assembly 15 as a plasma torch has been terminated, the gas supply is switched to oxygen for use of the assembly as an oxygen lance.

As described above, the plasma torch operation is employed to effect rapid melting of the scrap component of the scrap-molten metal-flux charge to the converter. However, it is also within the scope of the invention to utilize a completely solid charge which is converted to molten metal by the plasma torch in the first part of the cycle. In addition, a partial scrap charge can be melted down by plasma torch operation and then additional hot metal can be added before oxygen lancing is started.

Still another mode of operation, although generally less desirable, is to operate the plasma torch during the scrap melting period with a combustible gas, such as natural gas, so that the flame temperature of the combustible gas is greatly increased by preheating of the gas as it passes through the plasma region. Thus, the melting time is decreased very appreciably over the time which would be required using conventional combustion flames.

Although the primary advantage of the combined plasma torch-oxygen lance operation herein described is to facilitate scrap melting at the beginning of the cycle, it is also within the scope of the invention to operate the assembly 15 as a plasma torch during other portions of the operating cycle. For example, at the end of a heat it is frequently desirable to increase the temperature of the finished steel in order to accommodate additions of alloying agents or for other purposes. The present invention affords a simple and effective way of accomplishing the desired temperature adjustment. By resuming operation of the device 15 as a plasma torch for a brief interval at the end of the heat, the necessary heating effect is obtained rapidly without unduly prolonging the operating cycle.

Although it has been proposed to use ordinary burners or chemical combustion flames to facilitate melting of scrap in an oxygen converter, the present invention affords many advantages over such proposals. The heat transfer rate from a thermal plasma has been estimated as being six to eight times that of an oxygen-fed flame because the total heat content of the plasma includes not only the sensible heat of the high temperature gases but also the heat of dissociation or ionization. Consequently, the available high temperature and heat transfer rate allows the operator to charge to the converter a significantly greater amount of scrap than would otherwise be possible. Moreover, the use of a plasma torch avoids the use of heat exchangers which have been suggested to increase the temperature of the fuel gas and/or oxygen fed to a conventional burner. In situ melting of the scrap in the converter is easily accomplished either as a separately charged ingredient or as a component of the combined scrap-molten metal-flux charge. Thus, the invention avoids the necessity for a separate scrap melting apparatus, such as cupola, or separate scrap preheating means which has been suggested previously as an expedient for increasing the permissible scrap charge to a basic oxygen steelmaking operation. In addition, the invention makes it possible to avoid excessive oxidation of scrap during melting; there are no major interferences with or undesirable lengthening of the normal process cycle; and it is possible to eliminate the complications introduced in the gas disposal or recovery system by using a combustible fuel for in situ scrap melting.

Merely by way of illustration, but not by way of limitation, the following example of the invention is presented.

In a typical heat, the metallic charge to the converter comprises 698 lbs. of scrap and 1627 lbs. of molten pig iron, the scrap thus comprising about 30% of the metallic charge. Using a conventional oxygen lance operation with an oxygen consumption of 1800 s.c.f./ton steel, a metallic yield of about 86 wt. percent is obtained. However, if the present invention is utilized and the plasma torch operating on oxygen is used at the beginning of the cyle, the additional heat supplied to the oxygen gas at a temperature of about 1340° F. will amount to about 45,000 B.t.u per ton of steel. As a result, sufficient heat is available to melt an addition 75 lbs. of scrap so that the total permissible scrap charge is 773 lbs. or about 33% of the metallic charge. Thus, by heating the oxygen gas to the very moderate temperature of 1340° F. by the plasma torch operation at low power levels, an increase of 3% in the permissible scrape charge is obtained. Since much higher temperatures are easily obtainable by the plasma torch, it will be apparent that substantially greater increases in the scrap content of the charge can be realized. For example, by heating the oxygen to about 3000° F., enough additional heat is available to melt about 5% more scrap than could otherwise be accommodated.

We claim:

1. In the operation of a top blown basic oxygen converter wherein the converter is initially charged with raw materials including solid scrap, the improvement which comprises inserting into the mouth of the converter a combined oxygen lance and induction plasma torch device, melting said scrap by supplying electric power and a plasma-forming gas to said device so as to effect operation of said device as an induction plasma torch for a time sufficient to melt said scrap, and thereafter discontinuing the power supply to said device and refining the molten metal by supplying oxygen to said device so as to effect operation of said device as an oxygen lance.

2. A method of operating a top blown basic oxygen converter which comprises the steps of: charging said converter with raw materials, including molten metal and solid scrap; inserting into the converter a combined induction plasma torch and oxygen lance device, said device comprising elongated tubular means, a high frequency induction coil disposed around the lower end portion of said tubular means, and valve-controlled means at the upper end portion of said tubular means for supplying a plasma-forming gas to said tubular means when the device is used as a plasma torch and for supplying oxygen thereto when the device is used as an oxygen lance; supplying electric power to said coil, supplying a plasma-forming gas to said tubular means, and initiating operation of said device as a plasma torch; continuing said operation for a time sufficient to melt said scrap; and thereafter discontinuing the power supply to said coil and introducing oxygen through said tubular means so as to operate said device as an oxygen lance for refining the molten metal.

3. The method of claim 2 further characterized in that said plasma-forming gas comprises an inert monatomic gas which is supplied to said tubular means when said device is operated as a plasma torch and is replaced by oxygen when said device is operated as an oxygen lance.

4. The method of claim 3 further characterized in that said inert gas comprises argon.

5. The method of claim 2 further characterized in that said plasma-forming gas comprises oxygen which is supplied to said tubular means when said device is operated as a plasma torch and also when said device is operated as an oxygen lance.

6. The method of claim 5 further characterized in that operation of said device as a plasma torch is initiated using an inert monatomic gas and is continued using oxygen.

7. The method of claim 2 further characterized in that said plasma-forming gas comprises a combustible gas which is preheated and burned during melting of said scrap.

8. The method of claim 2 further characterized in that upon completion of the refining of said molten metal said device is again operated as a plasma torch for increasing the temperature of the molten metal.

References Cited by the Examiner

UNITED STATES PATENTS

| 3,112,194 | 11/1963 | DeVries | 75—59 X |
| 3,130,292 | 4/1964 | Gage et al. | 219—121 X |
| 3,147,330 | 9/1964 | Gage | 219—121 X |
| 3,175,817 | 3/1965 | Smith et al. | 266—34 |
| 3,194,941 | 7/1965 | Baird | 219—121 |
| 3,201,560 | 8/1965 | Mayo et al. | 219—121 |
| 3,226,592 | 12/1965 | Gough et al. | 219—121 X |
| 3,264,508 | 8/1966 | Lai et al. | 313—63 |

HYLAND BIZOT, *Primary Examiner.*

DAVID L. RECK, *Examiner.*

H. F. SAITO, *Assistant Examiner.*